United States Patent [19]

Wagner

[11] 3,883,461

[45] May 13, 1975

[54] ETHYLENE/VINYL CHLORIDE COMPOSITIONS

[75] Inventor: William G. Wagner, Imperial, Mo.

[73] Assignee: Monsanto Company, St. Louis, Mo.

[22] Filed: Nov. 5, 1973

[21] Appl. No.: 412,950

[52] U.S. Cl............ 260/27 R; 106/20; 260/23 AR; 260/881
[51] Int. Cl. .............................................. C09j 3/26
[58] Field of Search................ 260/27, 23 AR, 881; 106/20

[56] References Cited
UNITED STATES PATENTS

| | | | |
|---|---|---|---|
| 2,134,912 | 11/1938 | Dreshfield | 260/105 |
| 2,265,941 | 12/1941 | Foster | 260/105 |
| 3,399,157 | 8/1968 | Deex | 260/23 XA |
| 3,565,755 | 2/1971 | Davison | 260/27 |

*Primary Examiner*—Melvyn I. Marquis
*Assistant Examiner*—William E. Parker
*Attorney, Agent, or Firm*—N. E. Willis; H. B. Roberts; F. D. Shearin

[57] ABSTRACT

A heat sealable composition is provided which comprises an aqueous dispersion of an ethylene/vinyl chloride interpolymer and a rosin material.

9 Claims, No Drawings

ETHYLENE/VINYL CHLORIDE COMPOSITIONS

BACKGROUND OF THE INVENTION

FIELD OF THE INVENTION

The present invention relates to adhesive compositions, especially heat sealable compositions, and to heat sealed articles of manufacture. More particularly, the present invention is directed to heat sealable compositions of an ethylene/vinyl chloride interpolymer and a rosin material.

DESCRIPTION OF THE PRIOR ART

An advantage of polyethylene films is that very few materials will adhere to their surfaces. But in certain applications, various materials, such as paper, must be bonded by heat sealing to polyethylene films. Currently available heat seal adhesives, such as those containing ethylene/vinyl chloride interpolymers, generally are unsatisfactory.

BRIEF DESCRIPTION OF THE INVENTION

It was surprisingly found that the compositions of the instant invention containing ethylene/vinyl chloride interpolymers give strong adhesive bonds when used to bond materials to polyethylene films. These compositions are aqueous dispersions containing
a. a dispersed phase which comprises
1. 5 to 65 parts by weight of an ethylene/vinyl chloride interpolymer, and
2. for every one part of such interpolymer, from about 0.05 to 4 parts of a rosin material, and
b. a continuous phase which comprises water.

Another aspect of the present invention provides various substrates having heat sealed thereto a flexible organic film.

DETAILED DESCRIPTION OF THE INVENTION

As mentioned, one of the essential components of the dispersed phase is an ethylene/vinyl chloride (E/VCl) interpolymer. The term "E/VCl interpolymer" as used herein means not only copolymers containing ethylene and vinyl chloride, but also interpolymers containing, in addition to ethylene and vinyl chloride, other hydrophilic monomers.

These interpolymers comprise 5 to 70 percent ethylene and from 30 to 90 percent by weight vinyl chloride, based on the total weight of the interpolymer. Optionally, they can contain from about 0.1 to 15 percent by weight of another monomer or monomers.

Normally, water emulsions of these interpolymers are used in the practice of this invention. These E/VCl latices contain 1 to 60 parts of E/VCl interpolymer solids and from 40 to 99 parts by weight of water, based on the total weight of the latices. Minor amounts of reactants or by-products may also be present. The average particle size of these latices is generally from about 500 to 5000 angstroms.

Other hydrophilic monomers include amides, substituted amides, various acids and their salts and esters. Examples of amides and substituted amides include acrylamide; methacrylamide; N-(lower alkyl) acrylamides such as N-methylacrylamide, N-ethylacrylamide, and N-propylacrylamide; N-(lower alkyl) methacrylamides; N-(hydroxy substituted lower alkyl) acrylamides such as N-hydroxymethylacrylamide; N-(hydroxy substituted lower alkyl) methacrylamides; N-(alkoxymethyl) acrylamides such as N-methoxymethylacrylamide; N-isobutoxymethylacrylamide and N-decyloxymethylacrylamide; N-(alkoxymethyl) methacrylamides. Illustrative acids and their salts include acrylic acid; methacrylic acid; aconitic acid; itaconic acid, citraconic acid; maleic; fumaric, alkali metal salts such as sodium and potassium and ammonium salts of acrylic acid, methacrylic acid, maleic acid, fumaric acid, aconitic acid, itaconic acid or citraconic acid. Examples of esters include those of fumaric or maleic acid, such as monoethyl maleate and dipropyl fumarate, hydroxyethyl and hydroxy propyl esters of polycarboxylic acids, such as 2-hydroxyethyl and 2-hydroxypropyl esters of maleic, fumaric, itaconic, aconitic and citraconic acids; vinyl esters of alkanoic acids, such as vinyl formate and vinyl acetate, vinyl esters of sulfonic acids, phenyl sulfonic acid and alkylphenyl sulfonic acids such as vinyl phenylsulfonate. Lower alkyl groups contain 1 to 4 carbon atoms. Substituted alkoxy groups contain 1 to 10 carbon atoms in the alkoxy group. Preferred alkanoic acids contain 1 to 6 carbon atoms.

Illustrative interpolymer latices which can be used in the compositions of this invention are:

| | AMOUNT* |
|---|---|
| 1. E/VCl/Acrylamide (A) | 22/75/3 |
| 2. E/VCl/N-methylolacrylamide | 20/76/4 |
| 3. E/VCl/A | 19/78/3 |
| 4. E/VCl/A/N-isopropylacrylamide | 21/77/1/1 |
| 5. E/VCl/A/N-ethylmethacrylamide | 65/30/3/2 |
| 6. E/VCl/A/diammonium itaconate | 10/85/4/1 |
| 7. E/VCl/A/monobutyl acid maleate | 25/70/1/4 |
| 8. E/VCl/N-methylolacrylamide/ N-isobutoxymethylacrylamide | 20/70/5/5 |
| 9. E/VCl/A/sodium acrylate | 21/77/1/1 |
| 10. E/VCl/A/sodium methacrylate | 22/70/7/1 |

*Percent by weight, based on the total weight interpolymer.

It is preferred that the interpolymers be at least terpolymers containing ethylene, vinyl chloride and another monomer such as acrylamide, N-methylolacrylamide or N-isobutoxymethyl acrylamide. Preferably, the interpolymers contain from about 10 to 35 percent by weight of ethylene, from about 65 to 90 percent by weight of vinyl chloride, and from about 1 to about 10 percent of another monomer or combination of monomers. Preferably, the interpolymers are present in the latices in an amount from about 40 to 55 parts and water is present in an amount of from about 45 to 60 parts by weight.

The interpolymers used in accordance with this invention may contain substituents that may be hydrolyzed. However, they are generally used in their unhydrolyzed form, but hydrolyzed interpolymers are also included for use in this invention. Those interpolymers containing hydrolyzable substituents or groups may be hydrolyzed by small quantities of a strongly alkaline material such as an alkali metal hydroxide, or a quaternary ammonium hydroxide such as tetramethyl ammonium hydroxide, or by a strong acid such as the mineral acids, e.g., hydrochloride, sulfuric, phosphoric, nitric. The base or acid used preferably has an ionization constant higher than $10^{-4}$ at 25°C.

The hydrolytic modification is carried out by treating an E/VCl interpolymer latex with aqueous base or acid in an amount chemically equivalent to from about 0.1 percent to about 100 percent of the amount needed to hydrolyze a substituent.

The E/VCl interpolymer latices useful in this invention are readily prepared by various means well known in the art. For example, the interpolymers can be prepared by first mixing ethylene and vinyl chloride in an aqueous medium in the presence of any suitable anionic or nonionic emulsifier and any initiator capable of generating free radicals in the chemical mixture at the chosen reaction temperature and pressure. If an optional monomer is to be added, it may be added preferably in aqueous solution to the polymerizing ethylene and vinyl chloride mixture gradually or, depending upon its solubility, it may be dissolved in the vinyl chloride or it may be entered as a separate stream, throughout the reaction. The addition of the optional monomer is preferably begun after about 40 to 50 percent of the desired conversion of the ethylene and vinyl chloride has been reached. A shell-core latex in which the polar monomer is concentrated in the outer layers is produced. Another procedure which may be used to prepare the E/VCl interpolymer latices is described in detail in U.S. Pat. No. 3,428,582 and the subject matter thereof is expressly incorporated herein by reference.

The E/VCl interpolymer latices may be used in this invention as produced or they may be diluted to any polymer solids concentration in water.

As mentioned, the other essential component of the dispersed phase is rosin material. The term "rosin material" as used herein includes abietic acid in substantially pure form and any of the usual types of rosin such as wood rosin, gum rosin and tall oil rosin in a crude or a refined state. It also includes disproportionated rosin, partially or substantially completely hydrogenated rosin, polymerized rosin, modified and/or fortified rosin, as well as rosin sizes.

The term "rosin size" includes any of the well-known gum, wood or tall oil rosin sizes obtained by saponifying gum, wood or tall oil rosin usually to substantial neutrality with an alkaline material. It also includes modified or fortified rosin size as well as aqueous dispersions of rosin size.

It is preferred to use modified and/or fortified rosin, made by reacting or mixing with the rosin varying amounts of maleic anhydride, maleic acid, fumaric acid and/or formaldehyde in the presence of a sulfonic acid catalyst. Maleic acid, maleic anhydride or fumaric acid is generally adducted in an amount of 1 to 20 percent, preferably 4 to 12 percent by weight, based on the weight of the rosin. Formaldehyde is used in an amount of 1 to 3 percent by weight, based on the weight of the rosin. For example, a formaldehyde modified and fumaric fortified tall oil rosin contains about 70 percent by weight of tall oil rosin and 30 percent by weight of an adduct of fumaric acid and tall oil rosin. A more detailed description for preparing a modified and fortified rosin can be found in U.S. Pat. No. 2,994,635, which is incorporated herein by reference.

Preferably, aqueous dispersions of rosin, a modified and/or fortified rosin are used in the practice of this invention. Examples include dispersions that consist essentially of (a) a rosin component which is rosin, a modified and/or fortified rosin (b) water and (c) alkali metal alkyl benzene sulfonate as a stabilizer for the rosin material. Generally the rosin component is present in an amount from 1 to 60 percent, preferably 30 to 45 percent by weight, based on the total weight of the dispersion. The stabilizer, which is generally the sodium salt, is present in an amount of 1 to about 6 percent, preferably 1 to 3 percent by weight, based on the weight of the rosin component. A more detailed description of the above mentioned dispersions as well as others that may be used may be found in U.S. patent application Ser. No. 386,242, filed Aug. 6, 1973, in the names of Clemons and Daust, which is incorporated herein by reference.

Rosin sizes are described in U.S. Pat. Nos. 2,134,912; 2,265,941; 2,846,328; 2,873,203; 2,934,468; 2,985,537; 2,994,635 and 3,565,755; all of which are incorporated herein by reference.

Preferred rosin sizes include rosin size obtained by saponifying rosin with an alkaline material such as alkali metal hydroxides, carbonates or ammonia to an acid number of 6 to 20, and modified or fortified rosin sizes made by reacting or mixing with the rosin varying amounts of maleic anhydride or acid, fumaric acid and/or formaldehyde in the presence of a sulfonic acid catalyst. Maleic acid, anhydride or fumaric acid is preferably used in an amount of 4.0 to 12 percent by weight, based on the weight of the rosin. Formaldehyde is preferably used in an amount of 1 to 3 percent by weight, based on the weight of the rosin.

Other especially preferred rosin sizes are substantially homogeneous stable aqueous suspensions of finely divided particles having a particle size of from about 0.03 microns to about 3 microns, such aqueous suspension containing by weight from about 55 to about 70 percent water and from about 30 to about 45 percent rosin-containing material, the rosin-containing material containing from about 0 to about 75 percent rosin and from 25 to about 100 percent of an adduct reaction product of rosin and an acidic component, such as maleic acid, maleic anhydride or fumaric acid, the amount of adduct being from about 4 to about 8 percent of the weight of rosin-containing material, a relatively small amount of the rosin-containing material being saponified rosin-containing material which functions as a dispersing agent for the suspension, the amount of saponified rosin-containing material represented as a percentage of available carboxyl groups saponified, being from about 2 to about 4 percent.

Rosin esters may also be utilized and they include esters derived from glycerol, ethylene glycol and similar polyhydric alcohols of rosin acids. The acid number of the ester composition is generally below about 30. Particularly suitable rosin esters are the glycerol esters of polymerized wood rosin acid and the glycerol ester of hydrogenated wood rosin.

As mentioned, the rosin material is present in an amount of from about 0.05 to 4 parts of rosin material for every part of E/VCl interpolymer, preferably 0.1 part to 1.5 parts, and more preferably 0.25 to .6 part.

As mentioned, the E/VCl interpolymers and rosin material are dispersed in a continuous phase which comprises water. The dispersed components or dispersed solids may be at any suitable concentration. Generally, the total dispersed solids or simply total solids are from about 1 to about 50 percent, preferably about 35 to about 45 percent by weight, based on the total weight of the aqueous dispersion.

In addition to the above mentioned components, the compositions of the instant invention may contain plasticizers, crosslinking agents, thickeners and defoamers. They are usually present in small amounts. Pigments and fillers may also be present.

The compositions of the present invention may be prepared by conventional techniques. For example, a soluble form of rosin material may be dissolved in the aqueous phase of an E/VCl interpolymer latex. Alternatively, an E/VCl interpolymer latex can be blended with an aqueous dispersion of rosin.

An illustrative composition of the present invention contains

| | | |
|---|---|---|
| E/VCl/A* interpolymer | 25 | parts |
| Sodium Rosinate | 8.33 | parts |
| Water | 66.67 | parts |

*Composition 3 on page 4

Other compositions may be prepared by substituting in the same amount any of compositions 1, 2 and 4 to 10 described on page 4. Still other compositions may be prepared by substituting any of the commercially available rosin sizes in similar amounts for sodium rosinate.

As stated above, the compositions of this invention are used to bond flexible organic films to various substrates. They include glass, polyester, nylon, polyvinyl chloride and cellulosic substrates, particularly fabric, paper and wood. Paper includes all materials which are encompassed within the ordinary and usual meaning of the word. Generally speaking, paper includes cellulosic and other vegetable fibers formed into thin felts or nonwoven sheets.

Flexible organic films include polyethylene, polypropylene and polystyrene. These films have surfaces to which it is difficult to bond materials using currently available adhesives. Generally, they range in thickness from 0.0005 to 0.01 cm.

The compositions are used in a sufficient amount to heat seal the substrates to the flexible organic film. For example, for paper it could be applied such that the dry coating weight was from 0.2 to about 18 kg./270 square meters. Conventional techniques are employed. For example, the compositions of this invention may be applied to either or both of the surfaces to be joined. The composition may be applied to the whole surface or surfaces, or it may be applied only to select portions, typically the area where the heat seal is to be consumated. The dispersion is then dried, usually by applying heat. Then the two surfaces to be joined are placed together in an apparatus which will simultaneously heat and squeeze. The heat may be furnished by conduction from hot jaws or generated dielectrically in the substance itself. Temperatures at which seals are to be formed are controlled by setting the temperature of hot jaws. The squeezing pressure and dwell time can be varied at will.

After heating, the specimen is removed from the hot zone and allowed to cool. A good heat seal is evidenced by a joint strength suitable for the intended application. In sealing paper and film specimens, an excellent seal is indicated by a peeling strength of one pound (453.6 g) measured by pulling apart two strips, each 1 inch wide.

The principle and practice of the present invention will now be illustrated by the following example, which is provided to show the practice and use thereof, but is not intended that the invention be limited thereto, since modifications in technique and operation will be apparent to anyone skilled in the art. All parts and percentages in the following example are by weight unless otherwise indicated.

EXAMPLE 1

Sixty grams of an ethylene/vinyl chloride/acrylamide (E/VCl/A) interpolymer latex containing 30 grams of interpolymer solids were blended with 25 grams of an aqueous dispersion of rosin containing 10 grams of rosin solids. The interpolymer contained about 21 weight percent ethylene, 76 weight percent vinyl chloride and 3 weight percent acrylamide, and was prepared essentially according to the procedure of Example 1 of U.S. Pat. No. 3,428,582. The rosin dispersion was prepared essentially according to the procedure of Example 1 of Ser. No. 386,242. The resulting aqueous dispersion contained about 26 parts by weight of E/VCl/A and for each part of E/VCl/A, 0.33 part of rosin. Total solids were about 35 percent by weight, based on the weight of the dispersion. It contained about 65 percent by weight water and had a pH of about 5.5 at 25°C.

The following procedure was used to test the heat sealing ability of the dispersion of Example 1. It was applied to one SARAN polyvinylidene chloride coated paper sheet using a No. 3 Meyer wire wound rod. The freshly coated sheet was dried in a forced draft oven at 100°C. for 3 minutes. This yielded a dry coating of slightly less than 0.91 kg./270 square meters.

After this sheet cooled to room temperature, it was cut into 1 inch strips and heat sealed to 1 inch strips of polyethylene with a Sentinel Heat Sealer. The jaws were set so that they would be held together for 2 seconds at 20 pounds pressure at the heat sealing temperature given in Table 1 below. The coated surfaces of the strips were heat sealed to the corona discharged side of the polyethylene.

After the heat sealed samples cooled to room temperature they were tested for strength with an Instron Tensile Tester. The unsealed ends of the samples were clamped in the jaws of the Instron Tensile Tester and the load requirement to pull them apart was determined. These values are given in Table 1 below. Also tested, were sheets heat sealed with: an E/VCl interpolymer alone, (Sample 2), and a dispersion identical to Example 1 except that a commercially available rosin size dissolved in water was used in place of the rosin dispersion, (Sample 3).

TABLE 1

| Adhesive Formula | Heat Seal Strength in Grams | | | |
|---|---|---|---|---|
| | 93°C. | 121°C | 149°C. | 177°C. |
| Aqueous Dispersion of Example 1 | 245 | 645 | 636 | 681 |
| Sample 2 | 23 | 114 | 127 | 245 |
| Sample 3 | 45 | 472 | 495 | 645 |

From a consideration of the above specification, it would be understood that many improvements and modifications in details may be made without departing from the spirit and scope of the invention. It is to be understood, therefore, that the invention is not limited, except as defined by the appended claims, which constitute part of the description of the present invention, and are to be considered as such.

What is claimed is:

1. An aqueous dispersion containing a dispersed phase which comprises (1) about 5 to about 65 parts by weight of an ethylene/vinyl chloride interpolymer, and (2) for every part of said interpolymer, 0.05 to 4 parts of rosin material.

2. A dispersion according to claim 1 wherein said interpolymer contains ethylene in an amount of from about 10 to about 35 percent, vinyl chloride in an amount from 65 to about 90 percent, and an optional monomer in an amount of from about 1 to about 10 percent.

3. A dispersion according to claim 2 wherein said optional monomer is acrylamide.

4. A dispersion according to claim 3 wherein said rosin material is present in an amount of from about 0.1 to about 1.5 parts.

5. A composition according to claim 4, wherein said rosin material is rosin, fortified rosin, formaldehyde modified rosin or mixtures thereof.

6. An aqueous composition comprising (1) an aqueous dispersion of rosin and (2) an aqueous dispersion of an ethylene/vinyl chloride interpolymer, said ethylene/vinyl chloride interpolymer being present in said composition in an amount of from about 5 to about 65 parts by weight, and said rosin material being present in said composition in an amount of from about 0.05 to 4 parts of rosin material for every part of E/VCl interpolymer.

7. A composition according to claim 6 wherein said interpolymer contains ethylene in an amount of from about 10 to about 35 percent, vinyl chloride in an amount of from about 65 to about 90 percent, and an optional monomer in an amount of from 1 to about 10 percent.

8. A composition according to claim 7 wherein said optional monomer is acrylamide.

9. A composition according to claim 8 wherein said rosin material is rosin, a fortified rosin, a formaldehyde modified rosin or mixtures thereof and said rosin material is present in an amount of from 0.1 to about 1.5 parts for every part of ethylene/vinyl chloride interpolymer.

* * * * *